(12) United States Patent
Hirschek

(10) Patent No.: US 8,991,586 B2
(45) Date of Patent: Mar. 31, 2015

(54) HIGH-SPEED STORAGE

(75) Inventor: Herwig Hirschek, Bobingen (DE)

(73) Assignee: Mall Herlan MB GmbH, Neuhausen ob Eck (DE)

( * ) Notice: Subject to any disclaimer, the term of this patent is extended or adjusted under 35 U.S.C. 154(b) by 95 days.

(21) Appl. No.: 13/819,051

(22) PCT Filed: Jul. 6, 2011

(86) PCT No.: PCT/EP2011/061394
§ 371 (c)(1),
(2), (4) Date: Feb. 26, 2013

(87) PCT Pub. No.: WO2012/025285
PCT Pub. Date: Mar. 1, 2012

(65) Prior Publication Data
US 2013/0153363 A1      Jun. 20, 2013

(30) Foreign Application Priority Data
Aug. 27, 2010   (DE) .......................... 10 2010 035 670

(51) Int. Cl.
*B65G 37/00*      (2006.01)
*B65G 47/51*      (2006.01)
*B65G 65/00*      (2006.01)

(52) U.S. Cl.
CPC ............ *B65G 37/00* (2013.01); *B65G 47/5122* (2013.01); *B65G 65/00* (2013.01)
USPC ................................ 198/347.1; 198/347.3

(58) Field of Classification Search
CPC . B65G 2201/02; B65G 47/57; B65G 47/5109
USPC .......................................... 198/347.1, 347.3
See application file for complete search history.

(56) References Cited

U.S. PATENT DOCUMENTS

| 1,837,605 | A | * | 12/1931 | Baker | ..................... | 198/465.3 |
| 3,926,299 | A | * | 12/1975 | Bradley et al. | ............. | 198/347.3 |
| 4,690,342 | A | * | 9/1987 | Langen | ..................... | 198/347.3 |
| 5,473,978 | A | * | 12/1995 | Colombo | .................. | 198/347.1 |

(Continued)

FOREIGN PATENT DOCUMENTS

| DE | 202006009652 U1 | 10/2007 |
| EP | 1462396 A1 | 9/2004 |

(Continued)

*Primary Examiner* — James R Bidwell
(74) *Attorney, Agent, or Firm* — Bachman & LaPointe, P.C.

(57) ABSTRACT

A device (1) for the temporary storage of preferably unlacquered cans (11), comprising a supplying conveyor system (2), and intermediate storage system and a handling system (3) which is designed and controlled for simultaneously transferring a plurality of cans (11) from the conveyor system (2) to the intermediate storage system. The supplying conveyor system (2) is also simultaneously a delivering conveyor system (2); the handling system (3) is designed and controlled in order to simultaneously transfer a plurality of cans (11) from the intermediate storage system (30) to the conveyor system (2); a first auxiliary can store (8) and a first handover device (12), by way of which cans (11) can be transferred to the conveyor system (2), are disposed upstream of the conveyor system (2); and a second auxiliary can store (15) and a second handover device (17), by way of which cans (11) can be transferred from the conveyor system (2) to the second auxiliary can store (15), are disposed downstream of the conveyor system (2). A method for intermediate storage is also disclosed.

19 Claims, 8 Drawing Sheets

(56) References Cited

U.S. PATENT DOCUMENTS

| | | |
|---|---|---|
| 7,201,270 B2 * | 4/2007 | Moeller .................... 198/347.1 |
| 8,011,492 B2 * | 9/2011 | Davi et al. ................. 198/347.1 |
| 2009/0175691 A1 | 7/2009 | Hirschek |
| 2010/0080673 A1 * | 4/2010 | Von Der Waydbrink et al. ........................ 198/347.1 |
| 2010/0138041 A1 | 6/2010 | Benz et al. |
| 2013/0032448 A1 * | 2/2013 | Huettner et al. ........... 198/347.1 |

FOREIGN PATENT DOCUMENTS

| | | |
|---|---|---|
| EP | 2192061 A2 | 6/2010 |
| GB | 1177942 A | 1/1970 |

* cited by examiner

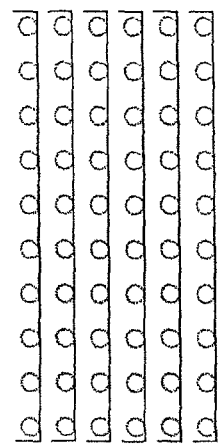
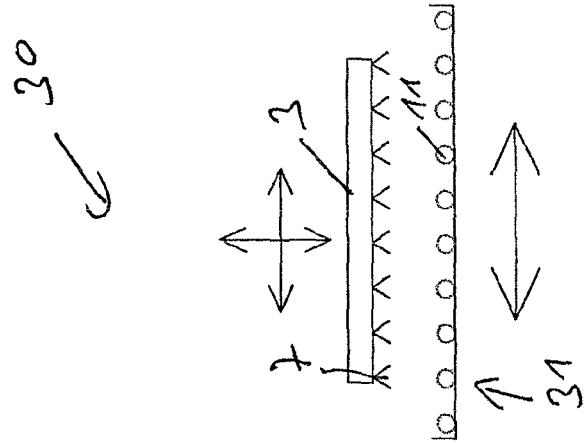
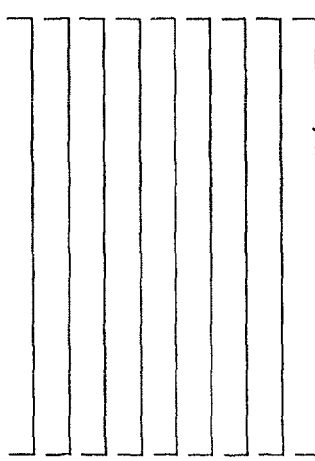
Fig. 6

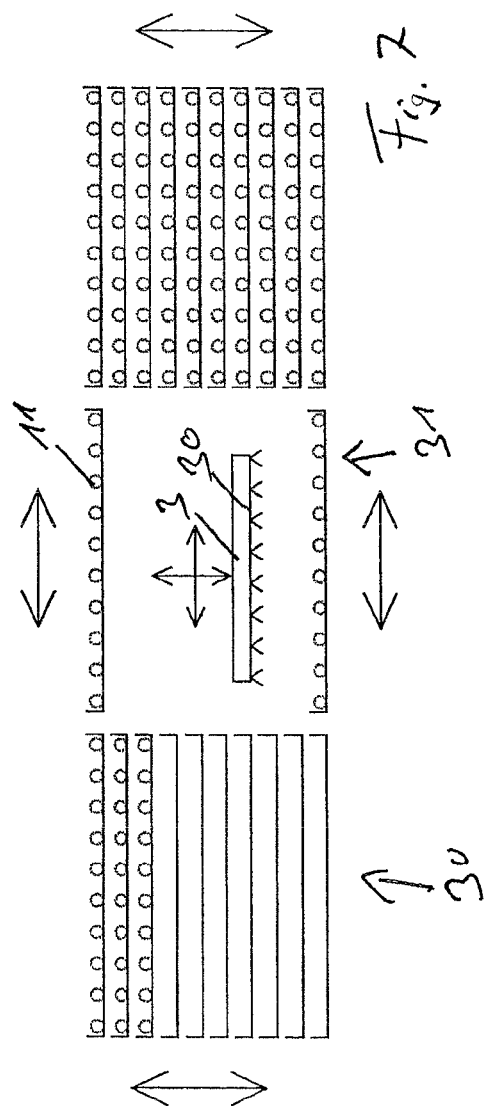

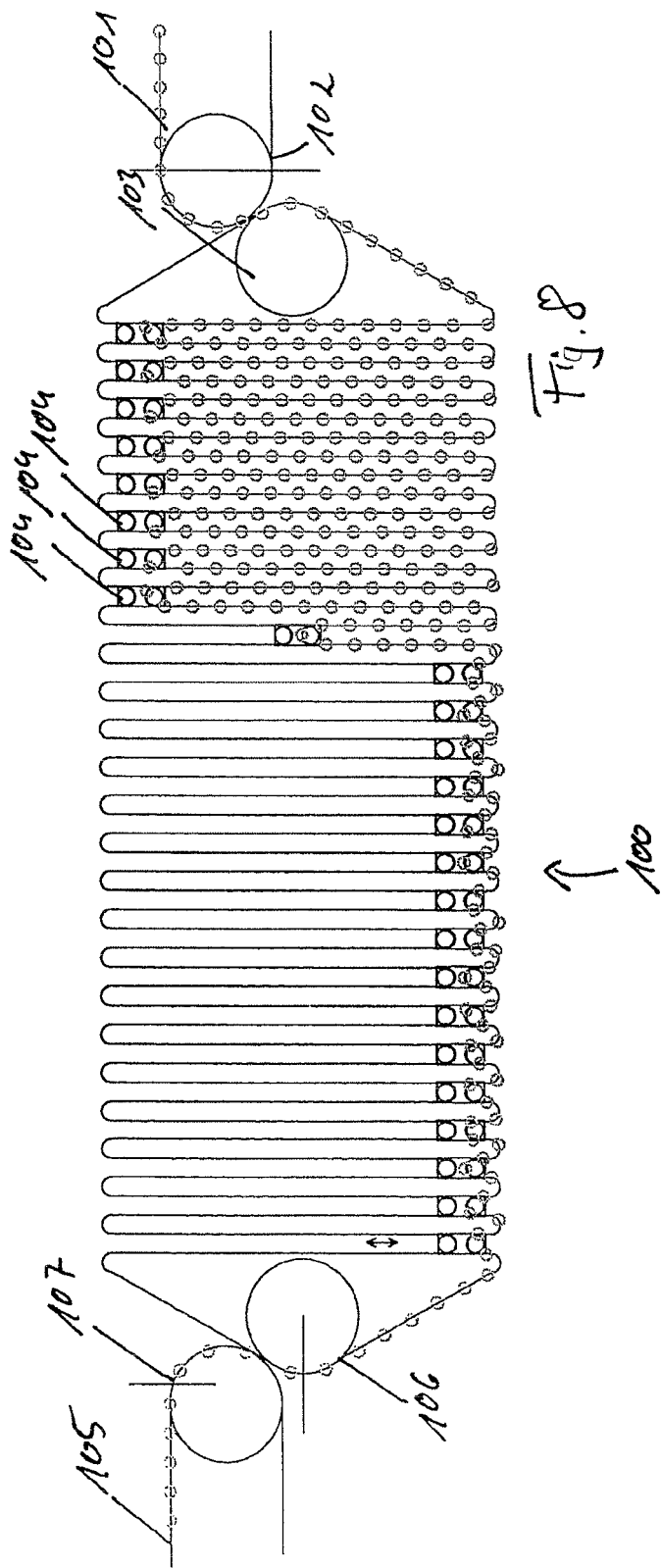

HIGH-SPEED STORAGE

BACKGROUND OF THE INVENTION

The invention relates to a device for temporarily storing preferably unlacquered cans that are preferably made of metal, comprising a supplying conveyor system, an intermediate storage system (for the cans), and a handling system which is designed and controlled for simultaneously transferring a plurality of cans from the conveyor system into the intermediate storage system.

Up to now, as an intermediate storage for temporarily storing unlacquered cans between individual production steps in a can production plant, so-called chain storages 100 are used which are exemplary illustrated in FIG. 8. The cans are transported from a non-illustrated production machine via a first transport chain 101 with chain pins to a chain storage 100 and are transferred into the latter via two vacuum loading drums 102, 103 that interact with each other. The loading drums are configured with push prisms, wherein each push prism holds in each case one can through suction on the circumference of the respective loading drum. Through this push function, the can held through low pressure can be removed from the transport chain 101, can be transferred to the loading drum 103 and can be pushed by latter onto the synchronously running chain storage 100.

The chain storage 100 is equipped with a multiplicity of carriages 104. The effective chain length of the chain storage and thus the stored length of cans is adjusted or controlled through the height position of the carriages 104. The transfer of the cans from the chain storage 100 to a second outfeeding transport chain 105 takes place via two further loading drums 106, 107 which work in a running direction opposite to the loaded loading drums 102, 103.

The storage capacity of known chain storages 100 is limited by the ceiling height which, in practice, is maximally 6 m. Thus, a chain storage with a length of 6 m has a storage capacity of only approximately 2,800 cans which, at a production speed of approximately 200 cans/min, corresponds to a storage time of approximately 14 min. In order to be able to achieve higher production outputs, efforts are made to implement higher quantities of stored cans.

Known chain storages are not only limited in terms of their storage capacity. There is also the problem that in practice the function of closing gaps is technologically manageable only up to approximately 250 cans/min. Higher speeds generate tumbling and pushing movements during the transfer by means of the loading drums 102, 103, 105, 106.

An intermediate storage system that is improved with respect to increased storage capacity is described in EP 2 192 061 A2. In contrast to a chain storage, the known storage system does not comprise a revolving transport chain with chain pins, but comprises instead transport belts on which the cans are placed so that the cans can be picked up from the supplying transport band by means of a handling system by inserting transport mandrels (insertion rods) into the cans. Temporarily storing is not carried out along a moving chain, as in the case of the chain storage, but in a high-rack storage system in which the storage containers containing the cans are temporarily stored spaced apart from each other. The disadvantage of using high-rack or paternoster storage systems is the required space which is still comparatively large. With the handling system, the cans are mechanically gripped by means of insertion rods, swiveled by 180°, and are deposited directly adjoining each other in the storage container. Hereby, the storage volume in the storage container can be minimized; however, this approach is not suitable for unlacquered cans since brushed and washed metal cans in the unlacquered state occasionally interlock with each other which, in the worst case, can result in stoppage of the intermediate system or to the loss of cans. Moreover, as in the case of the chain storage, the spatial depth is not utilized with the known intermediate storage system.

Furthermore, it is a disadvantage that with the handling system of the known device, which comprises insertion rods, only limited accelerations or decelerations can be implemented because otherwise there is the risk that during the transfer of the cans from the supplying conveyor system to a separate delivering conveyor system, cans can be spun off by the mandrels gripping the cans, or can slip or tumble.

An additional disadvantage is the limited possibility of closing (individual) gaps.

Proceeding from the aforementioned prior art, it is an object of the invention to propose a device and a method for temporarily storing preferably unlacquered, in particular brushed (metal) cans, by means of which gaps can be optimally closed without affecting the overall speed of the can production plant. Preferably, in addition, the available space shall be optimally utilized for temporarily storing the cans, wherein the method and the device shall be preferably suitable for use or implementation in a can production plant by means of which more than 300 cans/min, preferably more than 400 cans/min, and more preferably more than 500 cans/min can be produced.

SUMMARY OF THE INVENTION

This object is achieved by a device and method for temporarily storing unlacquered cans in a horizontal position.

Advantageous refinements of the invention are specified hereinbelow. In order to avoid repetitions, features disclosed within the context of the method shall be deemed as being disclosed within the context of the device. Likewise, features disclosed within the context of the device shall be deemed as being disclosed within the context of the method.

The invention is based on the idea, in contrast to the teaching of EP 2 192 061 A1, to dispose with a delivering conveyor system that is separate from a supplying conveyor system for supplying cans to the intermediate storage system (intermediate storage), and instead to utilize the supplying conveyor system at the same time for delivering cans from the intermediate storage. Moreover, the device designed according to the concept of the invention comprises, in addition to the actual intermediate storage (intermediate storage system) which can be filled with cans from the supplying conveyor system and from which cans be unloaded onto the same delivering conveyor system, two auxiliary can storages which preferably are designed in each case for temporarily storing an amount of cans that is smaller than the amount stored in the intermediate storage. Of these two auxiliary can storages, a first auxiliary can storage is arranged upstream of the (only) conveyor system allocated to the intermediate storage system, and a second auxiliary can storage is arranged in the conveying direction downstream of this conveyor system. The conveyor system connects the two auxiliary can storages in a bypass-like manner, wherein the first auxiliary can storage is allocated a first transfer device by means of which cans be transferred from the first auxiliary can storage onto the conveyor system. Furthermore, the second auxiliary can storage is allocated a second transfer device by means of which cans can be transferred from the conveyor system onto the second auxiliary can storage.

By providing a single conveyor system, the handling system is only used for bringing cans from and to the intermediate storage system. The function of transferring cans between two conveyor systems, as it is the case in EP 2 192 061 A2, has no longer to be fulfilled. Preferably, in normal operation, the handling system is simply idle and the conveyor system works in bypass operation.

Moreover, the handling system can be used for special sorting measures because, in contrast to the prior art according to EP 2 192 061 A2, the handling system is not used for continuous transfers between two conveyor systems. Thus, it is conceivable, for example, to fill gaps between cans in rows of cans deposited in the intermediate storage system by resorting said cans.

With the device designed according to the concept of the invention it is alternatively possible to transport cans directly from the first auxiliary can storage via the (only) conveyor system to the second auxiliary can storage, which acts as a bypass here, without the need to be temporarily stored in the intermediate storage system. Alternatively, a plurality of cans can be transferred simultaneously from the conveyor system into the intermediate storage system or from the intermediate storage system again onto the conveyor system. In order to be able to simultaneously transfer by means of the handling system a plurality of cans from the intermediate storage system onto the conveyor system, it is necessary to provide a sufficiently large gap between cans (free storage areas) on the conveyor system, wherein this is preferably carried out with the aid of the first auxiliary can storage together with the first transfer device, in particular in such a manner that the first transfer device is stopped and the conveyor system continues to run at least until the desired gap size is implemented. The actual closing of gaps, usually gaps between individual cans, in a region upstream of the conveyor system is preferably carried out with the aid of the first transfer device. In particular when the function of closing (individual) gaps is taken over by the first transfer device, in particular by a vacuum loading drum, it is advantageously achieved that the transfer speed from the first transfer device onto the conveyor system can be decoupled from the production speed of a production machine arranged upstream of the conveyor system and thus of the first transfer device.

In addition, the two auxiliary can storages serve for compensating small differences in production speed.

Overall, with the device designed according to the concept of the invention, preferably five operating states can be implemented which are illustrated in detail hereinafter.

With the device it is possible to close individual gaps which are caused by a (production) machine arranged upstream of the device or by a can transport arranged upstream thereof. Ideally, the individual gaps are closed by the first transfer device because hereby, rows of cans can be stored without gaps in the intermediate storage system, which makes the operation easier when removing the cans from the storage. As will be explained later on, in the case of the provision of first transfer means between the first auxiliary can storage and an upstream machine, it is theoretically also conceivable, additionally or alternatively to the first transfer device, to close gaps between cans with the optional first transfer means.

Furthermore, with the device designed according to the concept of the invention, it is possible to transfer cans, arranged in particular in a row, by means of the handling system from the conveyor system into the intermediate storage system. This operating state is in particular necessary if a machine arranged downstream of the device designed according to the concept of the invention (temporarily) runs a little bit too slow and the first and/or the second auxiliary can storage become/becomes too full. In this case, the handling system (robot) removes at least one row of cans, preferably removes repeatedly individual rows of cans, from the conveyor system and stores them in the intermediate storage. The resulting gap on the conveyor system (for example 20 individual gaps in a row) is closed, for example, in that the second transfer device stops, awaits the entire gap, and starts again only after the first can on the conveyor system arrives at the second transfer device. Hereby, the load is taken off the auxiliary can storages and the overall system is kept in balance, at least as long as the intermediate storage system has still storage capacity, or until the impaired running of the downstream machine has been corrected.

Furthermore, it is possible over a prolonged period of time to continuously transfer rows of cans from the conveyor system into the intermediate storage. This operating state is in particular used if the machine arranged downstream of the device designed according to the concept of the invention has come to a complete standstill. As long as the intermediate storage has still storage capacity, cans, in particular in rows, can be continuously picked up from the conveyor system, i.e., row for row, and can be stored in the intermediate storage. As soon as the downstream machine is operable again, the cans are transported again on the transport belt up to the second transfer device which preferably starts again exactly upon arrival of the first can and maintains the gapless row of cans in the second auxiliary can storage.

Another possible operating state of a device designed according to the concept of the invention is the simultaneous return travel of a plurality of cans arranged in particular in a row from the intermediate storage system onto the conveyor system. This function or this operating state of, in particular, the continuous unloading of the intermediate storage system takes place under normal operating conditions, i.e., when the machine arranged downstream of the device designed according to the concept of the invention runs without failures. It is preferred here that this downstream machine or the downstream machine runs at least 10% faster than the machine arranged upstream of the device according to the invention so that the auxiliary can storages can be slowly emptied. In good time before the auxiliary can storages are completely emptied, a sufficiently large gap consisting of a plurality of individual gaps can be generated on the conveyor system by temporarily stopping the first transfer device, which gap, in terms of its dimension, preferably corresponds exactly to the row of cans which is fed from the intermediate storage system by the handling system and is deposited by the handling system on the conveyor system. This process takes place sporadically and preferably always when the auxiliary can storages are empty enough for this purpose.

Another preferably implementable operating state relates to continuously and simultaneously restoring in each case a plurality of cans, preferably arranged as a row, from the intermediate storage system. This operating state is preferably implemented when the machine arranged upstream of the device according to the invention does not work and the intermediate storage system supplies rows of cans preferably with the (production) speed of the machine arranged downstream of the device according to the invention. Upon completion of this situation and restart of the upstream machine, the can loader of the conveyor system at the first transfer device is turned on again, namely preferably in such a manner that the last placement of a row of cans from the intermediate storage system onto the conveyor system is carried out by means of the handling system and without gaps.

Particularly advantageous is an embodiment variant of the device in which the first and/or second auxiliary can storage are/is designed as a chain storage so as to be able to temporarily store with these auxiliary can storages a certain number of cans in a simple manner. Preferably, these are small chain storages with less than 10, preferably less than 6, more preferred less than 3, and particularly preferred with only a single carriage for varying the effective chain length for storing.

Complete decoupling of the transfer speed for transferring cans from the first auxiliary can storage onto the conveyor system by means of the first transfer device from the production speed of a machine arranged upstream of the first auxiliary can storage or a supplying conveyor system allocated to said machine can be achieved by providing first transfer means, in particular in the form of two vacuum loading drums by means of which the cans, which are supplied by the machine arranged upstream of the device designed according to the concept of the invention, can be transferred onto the first auxiliary can storage. With the aforementioned refinement, the auxiliary can storage is completely decoupled from the upstream (production) machine, as a result of which it is possible through suitable controlling of the first transfer device and/or the auxiliary can storage to close (individual) gaps with a speed level which is lower compared to a normal speed level whereby collisions during the transfer are reduced. If, for example, the production speed of a machine arranged upstream of the device designed according to the concept of the invention is 400 cans/min, cans can be transferred by means of the first transfer device, for example, with a (manageable) temporary speed of only 200 cans/min.

However, decoupling an upstream machine by providing transfer means to the first auxiliary can storage is principally not necessary. Such transfer means are preferably used if the upstream machine does not use a chain conveyor (transport chain) for the throughput of the cans. Said transfer means serve in particular as a transfer aid between different means of transport. The same applies analogously to the second transfer means which, where applicable, can also be eliminated.

Particularly preferred, in addition to the second transfer device for transferring cans from the conveyor system onto the second auxiliary can storage, second transfer means are allocated to the second auxiliary can storage, by means of which second transfer means cans from the second auxiliary can storage can be transferred onto an outfeeding conveyor line so as to decouple in this manner the second auxiliary can storage, and thus the transfer speed for transferring cans from the conveyor system by means of the second transfer device onto the second auxiliary can storage, from the speed of the outfeeding conveyor line.

The first and/or the second transfer means are not mandatory. In particular if the adjoining position machines also have a chain conveyor, the latter can include the auxiliary can storages so that only a first and/or a second transfer device for transferring onto the conveyor system or for removing from the conveyor system are necessary.

It is particularly advantageous if the conveyor system, which simultaneously supplies and delivers and which is allocated to the intermediate storage, comprises a pocket conveyor belt with a multiplicity of transport pockets arranged next to each other, into which pockets the cans can be placed by means of the handling system or from which the cans can be removed by means of the handling system. Preferably, the transport pockets, which are preferably open at the top, are designed to receive in each case one single can.

As already mentioned, it is particularly advantageous if the first and/or second transfer device are/is designed as so-called vacuum drum (vacuum loading drum), wherein alternative transfer devices can also be used. Preferably, the provided first and/or second transfer means are in each case a combination of two such vacuum drums, wherein here too, alternatives can be implemented.

In a refinement of the invention it is advantageously provided that the preferably (still) unlacquered (metal) cans are not placed directly adjoining each other in a storage container of the intermediate storage system, but are spaced apart from each other, which, at first sight, is in contrary to a desired minimization of required space. However, through this it is surprisingly possible to achieve the significant advantage that the cans do not touch each other at any time so that a disturbance of the operation of the production plant due to an otherwise likely jamming of unbrushed cans is avoided. In order to minimize the storage space for the contactless arrangement of the cans or to optimize the storage volume by utilizing the available space, in a refinement of the invention, the spatial depth is used for the first time for temporarily storing the cans by depositing in a tray (shelf element) of the intermediate storage system not only one row of cans which are arranged lying side by side and do not touch each other, but instead, by depositing a plurality of rows arranged one behind the other. It is preferred that not only the cans of each row do not touch each other but, in addition, that also the cans of rows arranged one behind the other do not touch each other. It is particularly preferred that in a tray of the intermediate storage system more than two rows of cans are deposited one behind the other. Rows of horizontally lying cans, which rows are deposited one in front of the other or one behind the other, means that the cans of two adjacent rows face each other with their end faces, wherein it is preferred if the plurality of cans are deposited one behind the other in a horizontal plane, and wherein in the first instance it is principally irrelevant whether a second row is deposited before or behind the first row. Preferably, the rows of cans are deposited only in a single plane, i.e., a tray contains only cans that are arranged in one, preferably horizontal, plane, but no cans that are arranged on top of each other. Preferably, with each removal step or transfer step, one row of cans is deposited, and in a subsequent step, the next, preferably directly adjacent row of cans is deposited. Thus, as mentioned, through the above-described measure, the spatial depth is used for the first time. "One in front of the other" or "one behind the other" means here an arrangement perpendicular to the longitudinal extensions of the rows of cans.

It is preferred that the cans are deposited or temporarily stored lying horizontally in the trays, wherein depositing in a lying position means that the bottom or top side, i.e., the end face of the cans is not arranged parallel to a horizontal plane but preferably perpendicular thereto, thus, that the longitudinal axis of the cans extends approximately parallel to the horizontal plane, wherein also angles of inclination of the longitudinal axis to the horizontal plane of smaller than 30°, preferably smaller than 20°, preferred smaller than 10°, appear to be still acceptable.

As already explained, it is an essential core aspect of the refinement of the invention to transfer to the tray the cans which are in each case arranged in a row spaced apart from each other, and also to deposit them there spaced apart from each other. It is further preferred if, in addition, the rows of cans are also spaced apart from each other so that not only the cans within a row do not touch each other, but the rows of cans are also arranged without touching each other because the end faces of adjacent rows of cans, which end faces face each other and are preferably aligned parallel to each other, are spaced apart from each other. Alternatively, in order to further minimize the required space for storing the cans, it is conceivable that two adjacent rows in a tray touch each other such that the end faces of the cans rest inside each other. In this case too, it has to be ensured that the lateral surfaces of the cans arranged in a row do not touch each other.

For achieving the highest throughput speeds it is preferred if, in contrast the teaching of EP 2 192 061 A2, the handling system does not have a handling system with an insertion mandrel (insertion rods), but instead is equipped with suction means so as to engage via suction with the cans by applying low pressure on their lateral surfaces. Hereby, tumbling movements, which are likely to occur in the prior art during gripping or transferring the cans, can be reliably avoided.

In order to be able to implement an optimal amount of cans while requiring little space, or in order to enable a simple adaptation of the handling system to different can formats and, if necessary, to spacings resulting therefrom, it is preferred if the spacing between the suction means of the handling system is preferably automatically adjustable, for example, hydraulically, pneumatically or electromotively. Thus, for example, it is conceivable that individual gripper fingers (suction fingers) are arranged in a displaceable manner.

In order to minimize the space required for storing an increased number of cans, it is provided in a refinement of the invention as a further measure that in contrast to EP 2 192 061 A2, not a high-rack storage or a paternoster storage is used as an intermediate storage system (which is possible as an alternative and is within the scope of the invention), but that the intermediate storage system is configured as a stack storage system that is designed and intended for stacking trays filled with a plurality of rows of cans directly on top of each other, i.e., for building a pallet-stack-like tray stack consisting of a plurality of trays which contact each other directly. In contrast to the prior art, thus, the adjacent storage containers touch each other directly thereby minimizing the volume of the required space. The trays are preferably configured such that they can be securely stacked on top of each other so as to achieve a geometry similar to a packed pallet. Moreover, the stack storage system can be designed such that a finished tray stack can be removed from one side of the stack storage system, and from the other, preferably opposing side, a tray stack can be fed again. Hereby, further logistics with high storage capacities can be implemented. In principal, it is even possible to completely separate the can pressing process or deep drawing process from the later lacquering process, as a result of which a significant improvement of efficiency of the can production plant can be achieved because the presses, in particular the deep drawing systems, principally work slowly but continuously while the printing system works with high throughput rates; however, it requires changeover-related breaks.

Principally, the stack storage system can be designed according to two different principles. According to a first alternative, the stack storage system works according to the circulation principle. In this case, the storage space in the stack storage system itself can be optimized. In the case of the circulation principle, a transfer from one stack onto a second stack takes place not only in the operating area of the handling system but also in an area, in particular an upper area, which is spaced apart from said operating area and is preferably parallel thereto so that two stacks are obtained which "communicate with each other" and which always have the same height. In a second alternative, the stack storage system works according to the shuttle principle, wherein here in a first stack only empty trays are provided, and in a second stack only trays filled with cans are provided, and the stack heights generally vary.

The different principles thus differ in that in the case of the shuttle principle only one stack side is used for storing cans, for example, empty side on the left and filled side on the right, whereas in the case of the circulation principle, with the same volume, twice as much trays filled with cans can be accommodated.

It is particularly advantageous if the trays of the intermediate storage system have a plurality of preferably uninterrupted storage slots which extend perpendicular to the longitudinal extension of the rows of cans, and wherein of each row of cans, preferably, a single can is present in each storage slot. Within the storage slots, cans of adjacent rows face each other with their end faces. Due to the fact that perpendicular to the longitudinal extension of the row of cans, the storage slots are now formed continuously, i.e., without interruptions, i.e., without partitions, it is theoretically conceivable to displace the cans along the storage slots. Through this, the trays are independent of the can format and it is possible to store different can lengths with the same tray. Particularly preferred, the storage slots have in cross-section the shape of a prism so that each can, along two lines oriented parallel to the respective longitudinal extension of the can, touches in each case one angular face of a prism-shaped storage slot. At the same time, this shape ensures contactless storing of the cans in the raw state (preferably washed and brushed, but not lacquered). The length of each storage slot is configured such that a plurality of rows of cans, preferably more than two rows of cans extending perpendicular to the longitudinal extension of the storage slots, can be placed parallel to each other and one behind the other.

The invention is also directed to method for temporarily storing preferably unlacquered cans, in particular cans made of metal, preferably by using a device designed according to the concept of the invention as described in detail above. The basic point of the method is that by means of the handling system, if required, cans are removed from the conveyor system and transferred into the intermediate storage system and, if required, cans are transferred (back) from the intermediate storage onto the same conveyor system by means of the same handling system. Furthermore, cans are transferred by means of the first transfer device from the auxiliary can storage arranged upstream of the conveyor device onto the conveyor system, and are transferred by means of the second transfer device from the conveyor system into the second auxiliary can storage arranged downstream of the conveyor system.

In a refinement of the invention it is advantageously provided that in addition to the first transfer device, the device has first transfer means for transferring cans from a supplying conveyor line, which is in particular allocated to a (production) machine, into the first auxiliary can storage, and that closing (individual) gaps between cans is carried out with the first transfer device when transferring cans from the first auxiliary can storage into the conveyor system. Preferably, closing (individual) gaps between cans is not carried out with the first transfer means which decouple the first auxiliary can storage from the supplying conveyor line and thus from a machine arranged upstream of the device designed according to the concept of the invention.

Preferably, for filling the (individual) gaps between cans, the conveyor system is operated with a speed that is reduced compared to a normal speed and that is preferably higher than 0 m/s, and a gap between cans in the first auxiliary can storage is moved past a transfer position by means of the first transfer device, and a can following said gap between cans is transferred onto the conveyor system by means of the first transfer device with a speed that is reduced compared to the normal speed, in particular with a reduced transfer speed and/or rotational speed of the first transfer device, whereupon the speed of the conveyor system is preferably increased to normal speed, and the speed of the first transfer device is increased again.

Through the above described measures, extremely high numbers of can cycles can be implemented in a production plant since the conveyor system does not need to be stopped and therefore lower accelerations occur. In particular if comparatively low numbers of can cycles are to be implemented, it is alternatively also conceivable to stop the conveyor system so as to await a gap.

It is particularly advantageous if for filling (individual) gaps between cans the first transfer device is operated for a short time with a lower speed, in particular a lower transfer speed and/or rotational speed, than the first transfer means in order to avoid collisions.

BRIEF DESCRIPTION OF THE DRAWINGS

Further advantages, features and details of the invention arise from the following description of preferred exemplary embodiments and from the drawings.

In the figures:

FIG. 6 shows a schematic illustration of a stack storage system working according to the shuttle principle, FIG. 7 shows a schematic illustration of a stack storage system working according to the circulation principle, and FIG. 8 shows an illustration of a chain storage according to the prior art.

DETAILED DESCRIPTION

In the figures, identical elements and elements having identical functions are designated by the same reference numbers.

Figure 1:
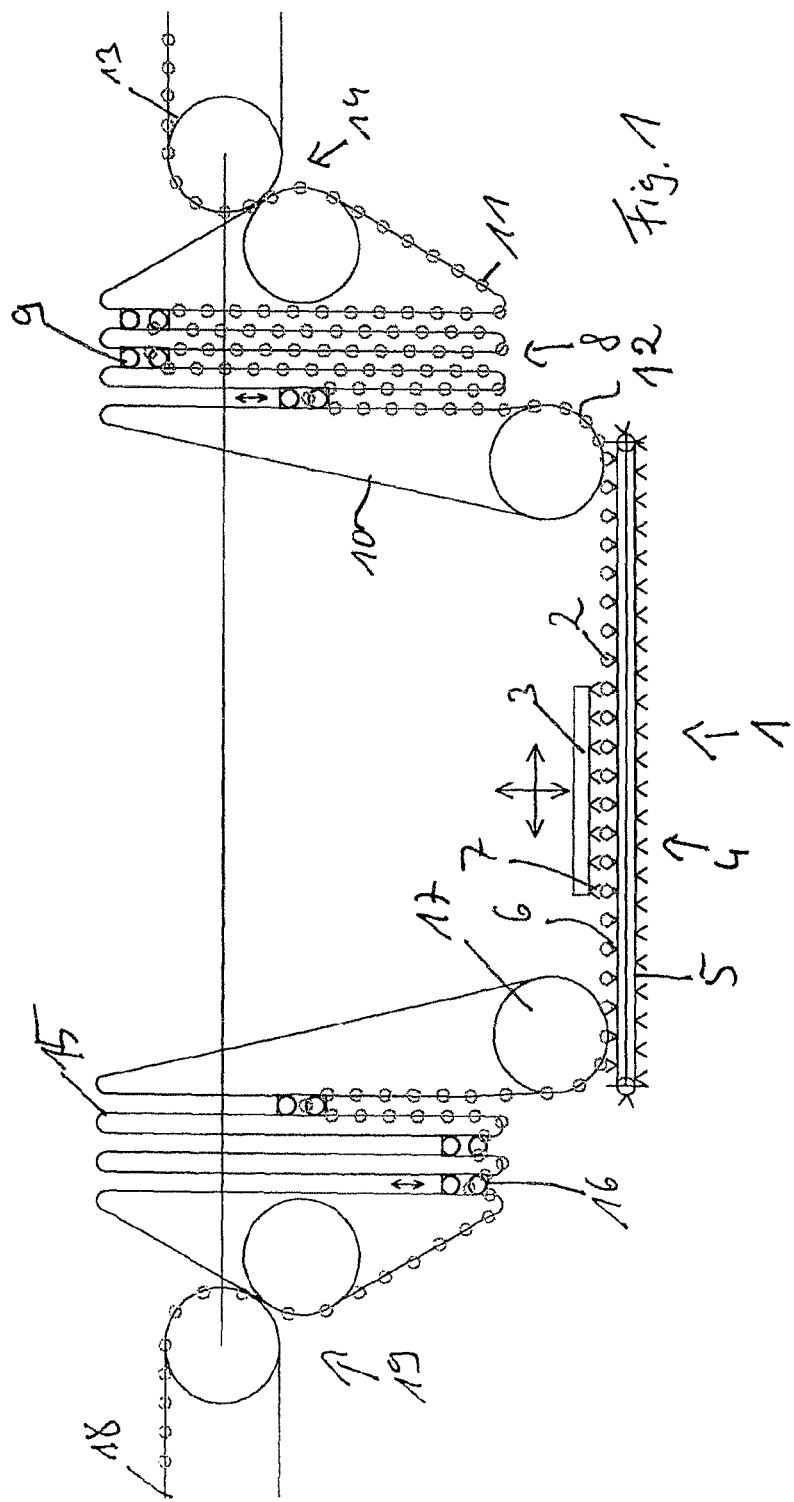
FIG. 1 shows a schematic illustration of a preferred embodiment of an intermediate storage device, wherein for reasons of clarity, the illustration of the associated intermediate storage system, in particular of a stack storage system, has been dispensed with, FIG. 2 shows a stack of a plurality of trays which are stacked on top of each other and are each filled with a plurality of rows of cans.

FIG. 1 shows a device 1 for temporarily storing unlacquered cans 11 made of metal. The device 1 comprises a supplying conveyor system 2 by means of which cans are transported to a handling system 3 by means of which a plurality of cans can be transferred simultaneously and spaced apart from each other into an intermediate storage system which is not illustrated for reasons of clarity. With the same handling system 3, a plurality of cans can be transferred again in a contactless manner onto the same conveyor system 2 for the purpose of delivery. The conveyor system 2 thus offers a transfer area 4 in which the handling system, for removing and loading, can interact with the conveyor system 2 or the cans and gap between cans, respectively, arranged thereon.

In order to be able to simultaneously remove a number of cans in a state spaced apart from each other by means of the handling system 3 (handling robot) from the conveyor system 2, which conveyor system is designed in the shown exemplary embodiment as a pocket belt conveyor 5 with a number of pockets 6 that are spaced apart from each other, the handling system 3 is equipped with a number of suction means 7 by means of which the cans can be held through suction in the area of their lateral surface. Preferably, the spacing (in the longitudinal extension of the conveyor system) between the suction means 7 is automatically adjustable.

As is further apparent from FIG. 1, a first auxiliary can storage 8 designed as chain storage is arranged in the conveying direction upstream of the conveyor system 2, which auxiliary can storage has in the shown exemplary embodiment a total of three first carriages 9 for adjusting the effective chain length for storing. The first auxiliary can storage 8 designed as a chain storage comprises a revolvingly driven transport chain 10 with chain pins (not illustrated) arranged thereon for receiving in each case one can 11.

The first auxiliary can storage 8 is allocated a first transfer device 12 designed as a vacuum loading drum in the shown exemplary embodiment, by means of which first transfer device, cans 11 can be transferred from the first auxiliary can storage 8 onto the conveyor system 2.

For decoupling (which is not necessary but rather advantageous) the first auxiliary can storage 8 from a conveyor line 13 preferably allocated to a non-illustrated production machine and supplying to the first auxiliary can storage 8, first transfer means 14 are allocated which, in the shown exemplary embodiment, comprise two vacuum drums interacting with each other in a manner known per se.

Viewed in the conveying direction, the conveyor system 2 is allocated a second auxiliary can storage 15 which is likewise designed as a chain storage and likewise has a total of three second carriages 16. For transferring cans from the conveyor system 2 onto the second auxiliary can storage 15, a second transfer device 17 designed as a vacuum drum is provided. For decoupling the second auxiliary can storage 15 from an outfeeding conveyor system 18, second transfer means 19 are provided in the form of two interacting vacuum drums.

In normal operation, the conveyor system 2 works as a bypass, i.e., said system can transport cans directly from the first transfer device 12 to the second transfer device 17 without the need of interaction with the conveyor system 2. If via the conveyor line 13 more cans 11 are supplied than cans are transported away via the outfeeding conveyor line 18, cans 11 can be picked up from the conveyor system 2 by means of the handling device 3 and can be transferred into a non-illustrated intermediate storage system, in particular a stack storage system. In order to be able to feed cans 11 again from the intermediate storage system into the production cycle, a gap between cans corresponding to the number of cans to be transferred is generated on the conveyor system 2 by suitably controlling the first auxiliary can storage 8 including the associated first transfer device 12, into which gap subsequently cans from the intermediate storage system can be transferred by means of the handling system 3. More specifically, the first transfer device 12 is stopped so as to generate a suitable gap between cans on the conveyor system 2, wherein for this purpose, accordingly, the conveyor system has to continue to run while the first transfer device 12 is stopped. The amount of cans produced in the meantime, which is fed from a machine arranged upstream of the first auxiliary can storage, is collected in the first auxiliary can storage 8. Alternatively, in particular when setting up a production of more than 250 cans/min, it is possible to simply reduce the speed of the conveyor system to a speed higher than 0 m/s, wherein for the transfer, the speed of the first transfer device has then to be adjusted correspondingly.

The function of the so-called closing of (individual) gaps is preferably carried out by the first transfer device 12, i.e., this function is not implemented by means of the first transfer means 14. This offers the particular advantage that the transfer function from the first transfer device 12 to the conveyor system 2 is not dependent on the upstream production speed and thus the conveying speed of the supplying conveyor system 13 because the first auxiliary can storage 8 decouples the production speed from the transfer speed of the first transfer device 12. Hereby, individual gaps can preferably be filled at a speed level that is low compared to a normal transfer speed so that collisions during the transfer are reduced. In particular, if the aforementioned speed reduction acts only for a very short period of less than one second, the overall level of the production speed is only insignificantly influenced by transferring the cans or by closing the individual gaps.

Figure 2:
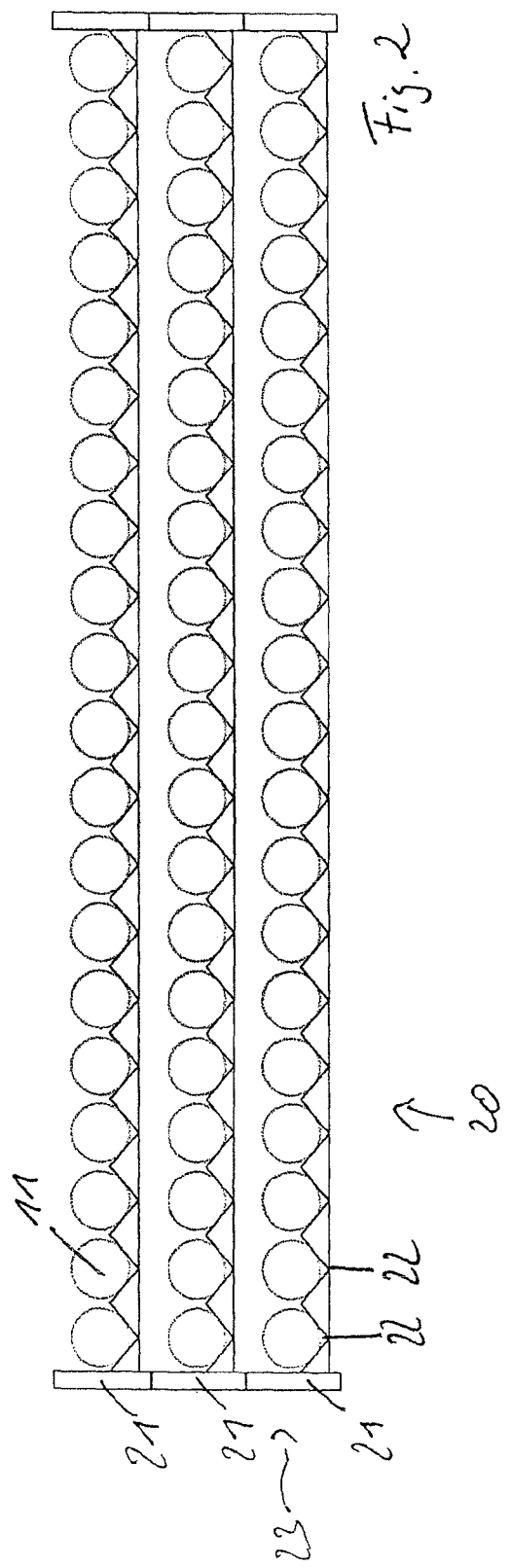

FIG. 2 shows a tray stack 20 of the intermediate storage system designed as a stack storage system or, respectively, a tray stack 20 built by means of the intermediate storage system, said tray stack comprising in FIG. 2 three trays 21 which are stacked directly on top of each other and engage with each other in a positive-locking manner.

As is apparent from FIG. 2, which shows a side view of the tray stack 20, each tray 21 has a number of storage slots 22 which have a prism-shaped contour. Shown is in each case a front row 23 of cans, wherein immediately behind each row 23 of cans, there is a plurality of further rows of cans, each of them in the same horizontal plane as the front row 23.

The storage slots 22 extend perpendicular to the longitudinal extension of the rows 23 of cans 11 into the plane of projection so that the same tray 21 can be used for different can formats, in particular for different can diameters and can lengths.

Figure 3:
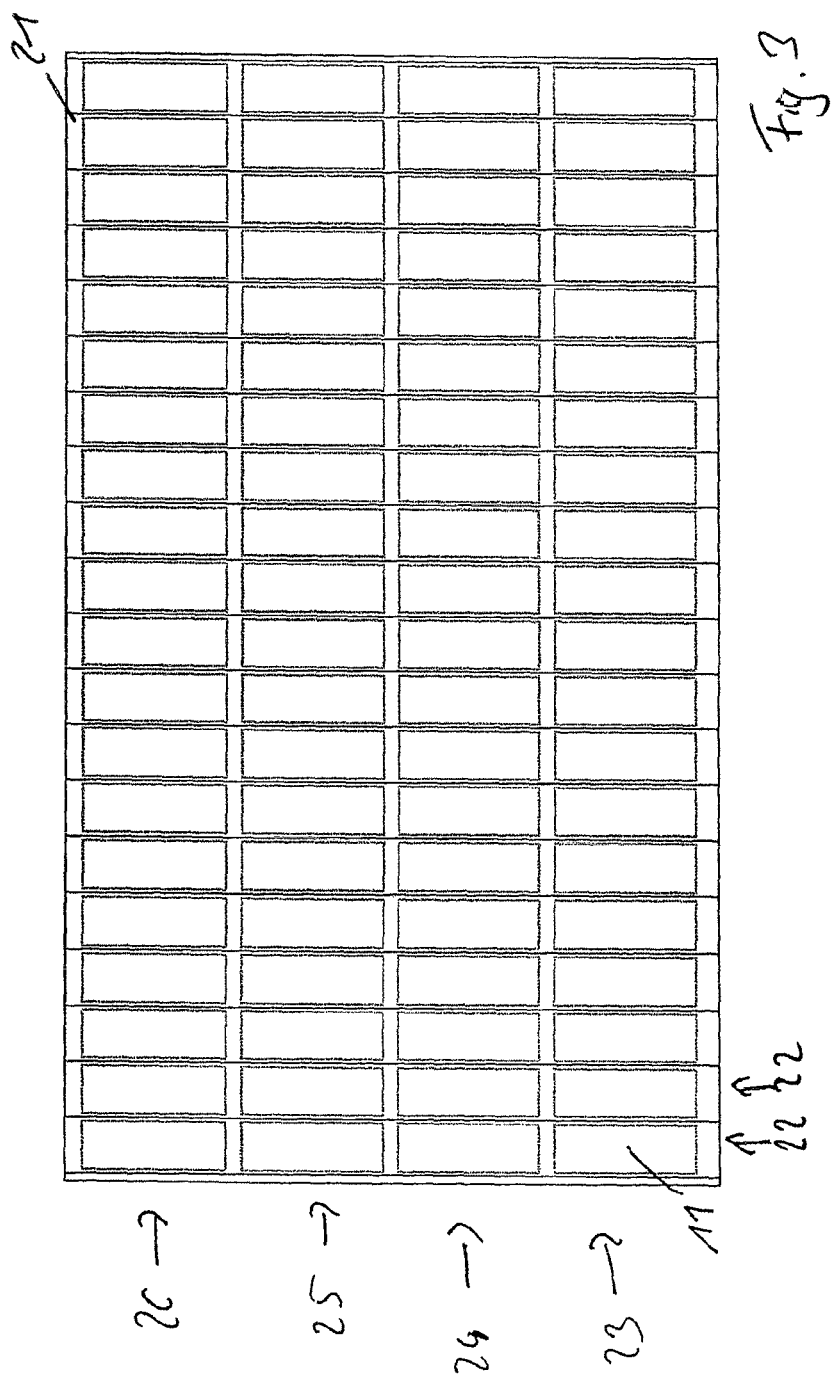
FIG. 3 shows a top view on a filled tray with a total of four rows of cans arranged one behind the other.

FIG. 3 shows a top view on a completely filled tray. Shown are the storage slots 22 extending perpendicular to the rows of cans. In the shown exemplary embodiment, four cans lie spaced apart from each other in each of the storage slots 22, wherein each can in a storage slot 22 is allocated a row 23, 24, 25, 26 of cans.

When filling the trays 21, preferably, first a first row 23 of cans 11 is deposited, whereupon then in the horizontal plane a second row 24, then a third row 25 and a fourth row 26 are deposited behind the first row 23. The minimum requirement is the provision of two, in particular parallel rows, preferably of more than two parallel rows, for utilizing the spatial depth.

Figure 4:
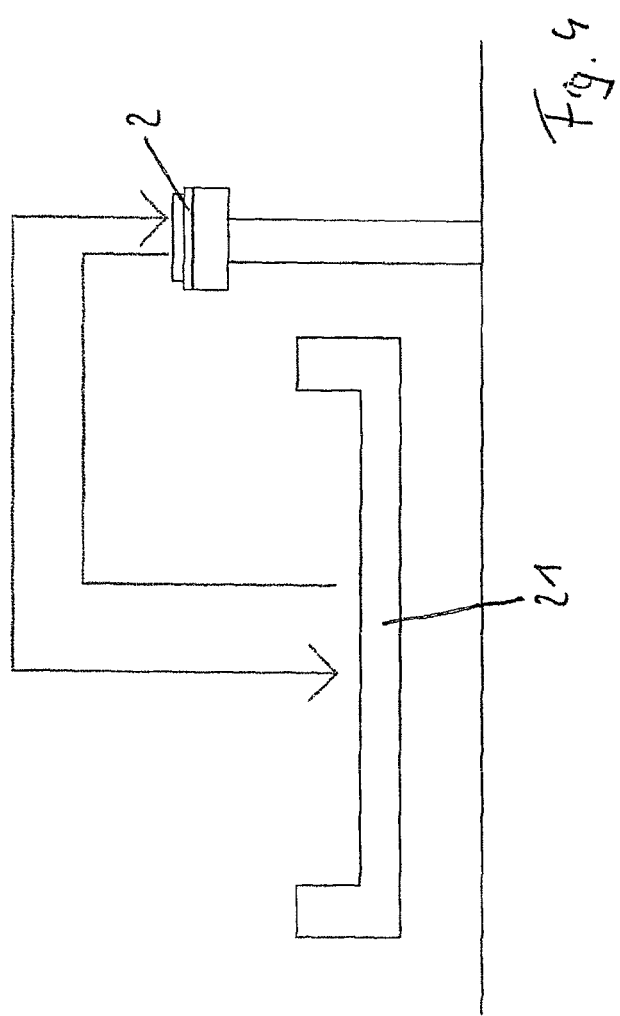
FIG. 4 shows in a schematic illustration the travel path of the handling system for transferring cans from the (only) conveyor system into the intermediate storage system.

FIG. 4 shows a removing, transferring and tray-loading cycle of the handling system. Cans 11 can be picked up from the conveyor system 2 by means of the handling system 3 and can be deposited in rows in a tray 21. It is also possible to remove a row of cans again from the tray 21 and to transfer it to an adequately large gap of the conveyor system 2.

Figure 5:
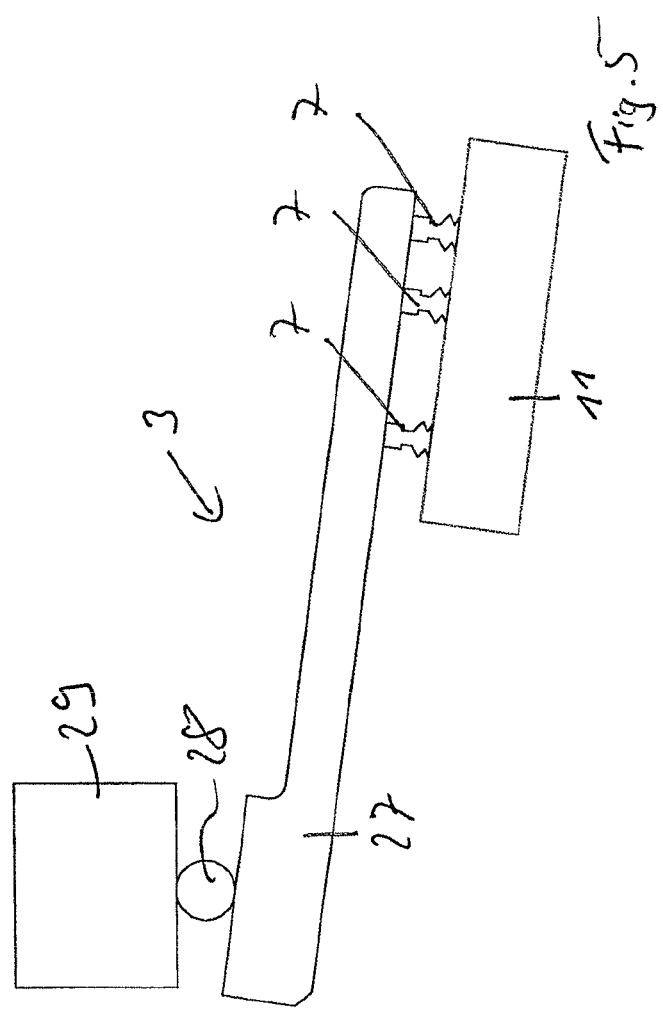
FIG. 5 shows in a schematic illustration a view of the handling system with suction grippers.

FIG. 5 shows schematically a handling system 3, wherein in the shown exemplary embodiment, each can 11 is allocated a plurality of suction means 7 so as to be able to engage with the can 11 through suction in different areas of the lateral surface of the can.

The handling system 3 comprises a swivel arm 27 which is connected via a swivel joint 28 to a horizontally and vertically displaceable carrier 29.

FIG. 6 shows a possibility for constructing an intermediate storage system 30 designed as a stack storage system. In the shown exemplary embodiment, the latter works according to the so-called shuttle principle, wherein in a first stack in the left half of the drawing, a plurality of empty trays are stacked directly on top of each other. From this stack located in the left half of the drawing, in each case the undermost empty tray 21 is removed and transferred, in the present case, to a middle loading and unloading position 31 in which a handling system 3 can interact with suction means 7 so as to load or unload the tray 21. The suction means 7 allocated to different cans can be automatically adjusted with regard to their spacing.

After a plurality of rows of cans 11 have been deposited one behind the other in a horizontal plane in the tray 21 in the loading and unloading position 31 and the tray 21 is filled, said tray is conveyed to the stack located to the right in the plane of projection and is added from below to the stack located there. To the left in the plane of projection, empty trays 21 can be refilled, if necessary, by means of suitable devices such as a forklift or a suitable robot, and to the right in the plane of projection, stacked trays can be removed. It is also conceivable to use the intermediate storage system 30 in the form shown if the number of trays 21 shuttled back and forth is high enough. For the sake of completeness is should be mentioned with regard to FIG. 6 that in the reverse case, during emptying, the trays 21 are added, after unloading, from the right side of the plane of projection or from the loading and unloading position 31 from below into the stack on the left in the plane of projection.

FIG. 7 shows an alternative embodiment variant of an intermediate storage system 30. This intermediate storage system 30 designed as a stack storage system works according to the circulation principle wherein always two tray stacks have the same height, and for each tray fed to the right stack, a tray is removed at the top and is placed from above onto the tray stack on the left in the plane of projection. In a stack storage system working in a circulating manner it is possible, with the same total volume, to store twice the amount of cans compared to a stack storage system working according to the shuttle principle.

The invention claimed is:

1. A device for temporarily storing cans, comprising:
 (a) a supplying conveyor system;
 (b) an intermediate storage system;
 (c) a handling system which is designed and controlled for simultaneously transferring a plurality of cans from the conveyor system into the intermediate storage system, wherein the supplying conveyor system is at the same time also a delivering conveyor system, and the handling system is designed and controlled for simultaneously transferring a plurality of cans from the intermediate storage system onto the conveyor system;
 (d) a first auxiliary can storage and a first transfer device for transferring cans onto the conveyor system are arranged upstream of the conveyor system; and
 (e) a second auxiliary can storage and a second transfer device for transferring cans from the conveyor system into the second auxiliary can storage are arranged downstream of the conveyor system.

2. The device according to claim 1, wherein at least one of the first auxiliary can storage and/or the second auxiliary can storage is designed as a chain storage comprising less than ten carriages for varying the effective chain length for storing.

3. The device according to claim 1, wherein at least one of the first auxiliary can storage and/or the second auxiliary can storage is designed as a chain storage comprising less than six carriages for varying the effective chain length for storing.

4. The device according to claim 1, wherein at least one of the first auxiliary can storage and/or the second auxiliary can storage is designed as a chain storage comprising less than three carriages for varying the effective chain length for storing.

5. The device according to claim 1, wherein at least one of the first auxiliary can storage and/or the second auxiliary can storage is designed as a chain storage comprising less than one single carriage for varying the effective chain length for storing.

6. The device according to claim 1, wherein the first auxiliary can storage is allocated first transfer means by means of which cans can be transferred from a supplying conveyor line into the first auxiliary can storage, and the second auxiliary can storage is allocated second transfer means by means of which cans can be transferred from the second auxiliary can storage to an outfeeding conveyor line.

7. The device according to claim 1, wherein the supplying conveyor system is designed as a pocket belt conveyor comprising a multiplicity of transport pockets arranged next to each other for accommodating, in each case, a single can.

8. The device according to claim 1, wherein the first and the second transfer device are designed as a vacuum drum.

9. The device according to claim 1, wherein the handling system is designed to, in a first step, remove a plurality of cans spaced apart from each other from the conveyor system, transfer the cans spaced apart from each other to a tray of the intermediate storage system, and deposit the cans on the tray in a lying position and spaced apart from each other in a first row; and the handling system is designed to, in a second step, remove further cans spaced apart from each other from the conveyor system, transfer the further cans spaced apart from each other to the tray of the intermediate storage system and deposit the further cans on the tray in a lying position in a second row which is parallel to the first row.

10. The device according to claim 9, wherein the handling system deposits the rows of cans either spaced apart from each other on the tray of the intermediate storage system, or wherein the rows of cans touch each other exclusively with end faces of the cans.

11. The device according to claim 1, wherein the handling system includes suction means for holding the cans by unprinted lateral surfaces of the cans.

12. The device according to claim 1, wherein spacing between the suction means is automatically adjustable.

13. The device according to claim 1, wherein the intermediate storage system is designed as a stack storage system for forming a tray stack comprising a plurality of trays in a vertical stack.

14. The device according to claim 10, wherein the trays have a plurality of storage slots arranged next to each other and parallel to each other to prevent the cans deposited in rows extending perpendicular to the storage slots from touching each other, wherein the storage slots are designed to extend continuously in the direction of their longitudinal extension such that a can is displaceable in each storage slot along the longitudinal extension thereof.

15. The device according to claim 14, wherein all cans can be deposited on the tray in a common horizontal plane.

16. The device according to claim 9, wherein the handling system is designed to remove the cans that are spaced apart from each other from the tray of the intermediate storage to the conveyor system in a spaced apart manner.

17. A method for temporarily storing cans, comprising the steps of:
  (a) providing a device comprising a conveyor system, an intermediate storage system and a handling system;
  (b) filling the intermediate storage system with a plurality of cans which are transferred simultaneously by the handling system from the conveyor system to the intermediate storage system;
  (c) simultaneously the conveyor system is emptying the intermediate storage system by means of the handling system, wherein a plurality of cans are transferred simultaneously from the intermediate storage system onto said conveyor system; and including
  (d) for filling the gaps between cans, operating the conveyor system with a speed that is reduced compared to a normal speed, wherein a gap between cans in a first auxiliary can storage is moved past a transfer position by means of the first transfer device, and a can following said gap between cans is transferred onto the conveyor system by means of the first transfer device at a speed that is reduced compared to the normal speed, thereafter the speed of the conveyor system is increased to normal speed, and the speed of the first transfer device is increased.

18. The method according to claim 17, including filling gaps between cans with a first transfer device by a first transfer means.

19. The method according to claim 18, including filling gaps between cans by operating the first transfer device at a lower speed than the first transfer means.

* * * * *